United States Patent [19]
Zulliger

[11] 3,742,729
[45] July 3, 1973

[54] ASSEMBLY SHOCK MOUNTING AND HEAT COUPLING SYSTEM

[75] Inventor: Hans R. Zulliger, Portola Valley, Calif.

[73] Assignee: United Scientific Corporation, Menlo Park, Calif.

[22] Filed: Apr. 23, 1971

[21] Appl. No.: 136,673

[52] U.S. Cl............ 62/514, 165/69, 165/82, 165/185, 250/51.5
[51] Int. Cl............................................ F25b 19/00
[58] Field of Search ............. 62/514; 165/69, 81, 165/82, 185; 250/51.5

[56] References Cited
UNITED STATES PATENTS

| | | | |
|---|---|---|---|
| 3,179,802 | 4/1965 | Hall, Jr. .................... | 62/514 X |
| 3,216,210 | 9/1965 | Klipping................... | 62/514 X |
| 3,301,319 | 1/1967 | Merrill..................... | 165/185 X |
| 3,423,955 | 1/1969 | Wright..................... | 62/514 |
| 3,543,842 | 12/1970 | Merges.................... | 165/82 |
| 3,609,992 | 10/1971 | Cacheux................... | 62/514 |
| 3,611,746 | 10/1971 | Mursing et al............. | 62/514 |

*Primary Examiner*—Meyer Perlin
*Assistant Examiner*—Ronald C. Carosella
*Attorney*—Townsend & Townsend

[57] ABSTRACT

A shock mounting and heat coupling system providing shock free mounting and heat conductive coupling between an assembly such as an X-ray spectrometer and a heat reservoir such as a croystat. Heat coupling is provided by a plurality of strands of heat conducting material connected between the heat reservoir and the assembly to provide a flexible inelastic heat pathway. Structural mounting is provided by a flexible, highly damped, low heat conductive shock absorber connected between the assembly and a housing rigidly extending from the heat reservoir. An X-ray spectrometer using the mounting and coupling system is described.

8 Claims, 6 Drawing Figures

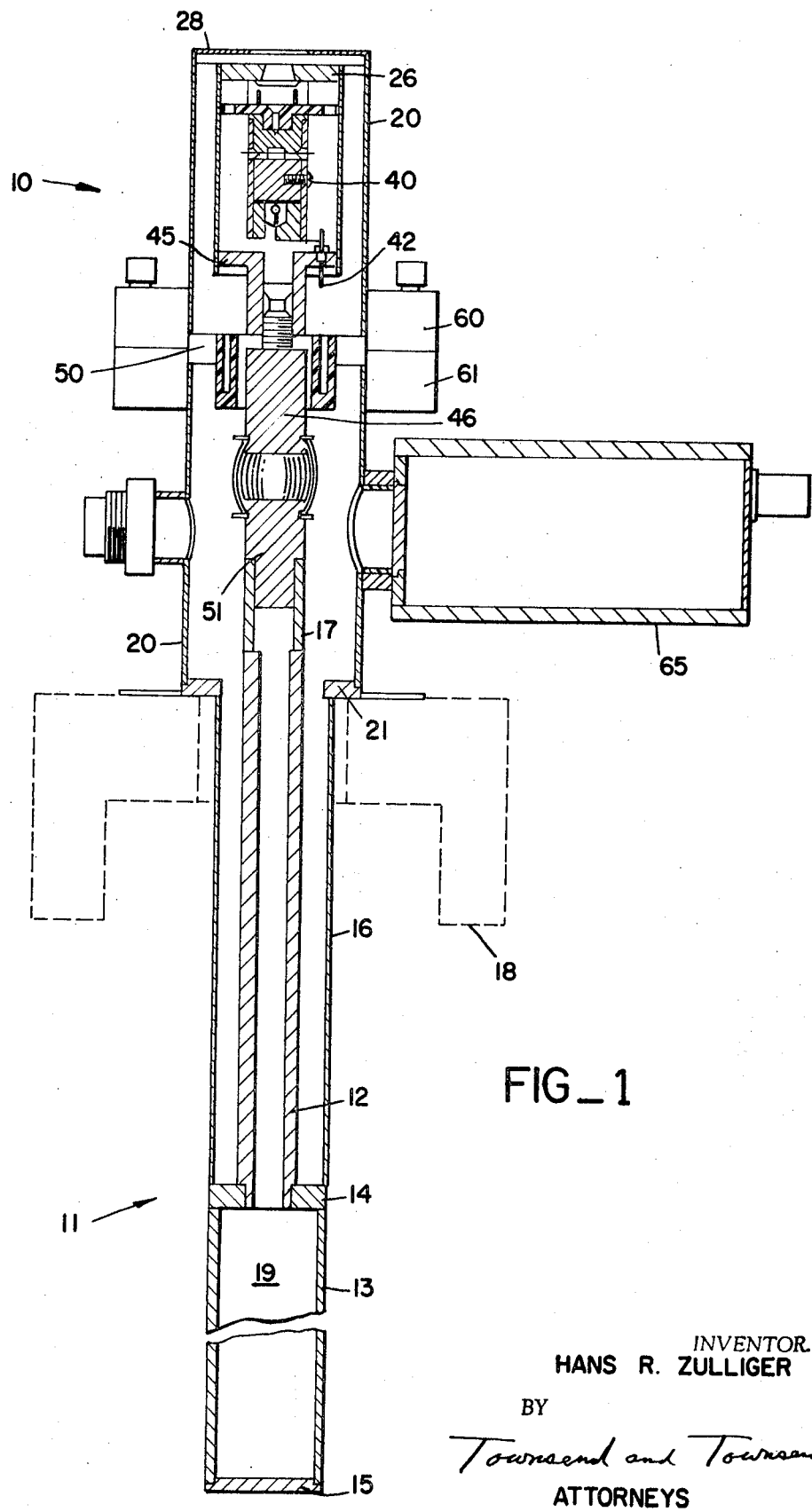
FIG_1

PATENTED JUL 3 1973  3,742,729
SHEET 2 OF 2
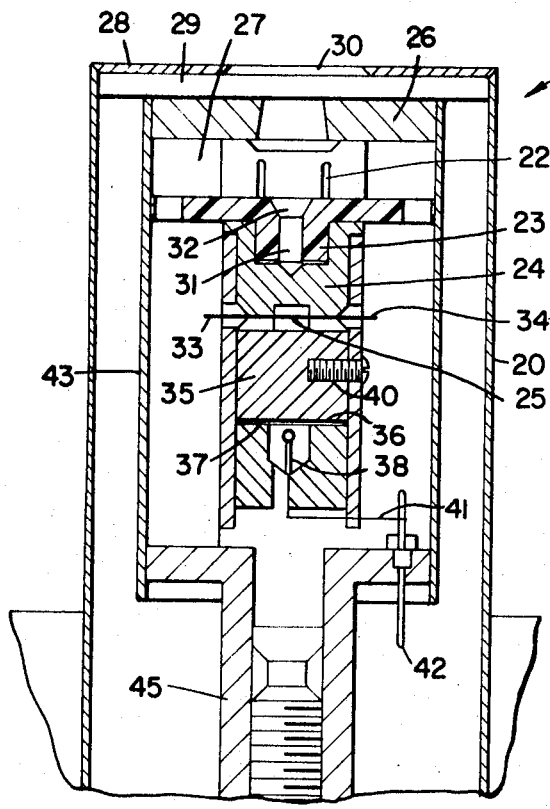
FIG_1A
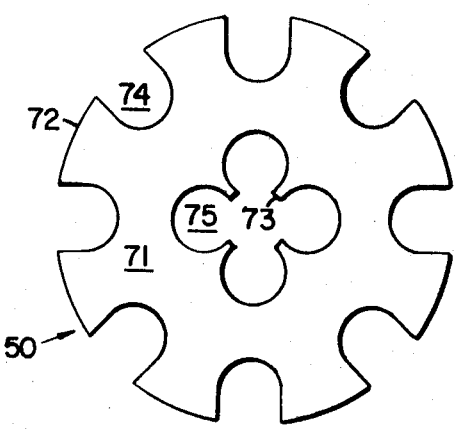
FIG_3
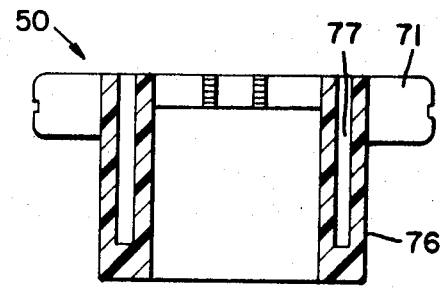
FIG_4
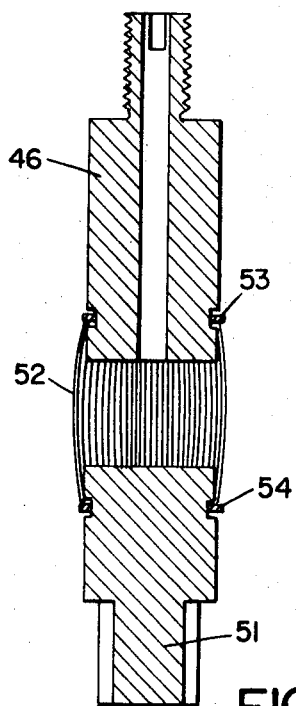
FIG_2
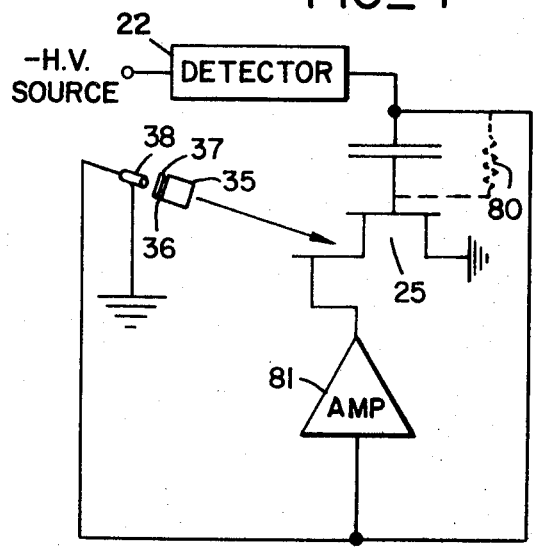
FIG_5
INVENTOR.
HANS R. ZULLIGER
BY
Townsend and Townsend
ATTORNEYS

ASSEMBLY SHOCK MOUNTING AND HEAT COUPLING SYSTEM

This invention relates to a new and improved shock mounting and heat coupling system for providing a shock free mounting and heat conductive coupling between an assembly such as a detector and a heat reservoir such as a cryostat. In particular the invention relates to a new and improved shock mounted and heat coupled X-ray spectrometer.

In detector assemblies such as X-ray spectrometer assemblies which operate at low temperatures, problems are often encountered as a result of acoustic and mechanical vibrations originating in the low temperature source. Thus, for example, the low temperature source may comprise an elongate rod or cryostat "dipstick" of high heat conductive material such as metal which is inserted in liquid nitrogen. The evaporation of nitrogen in small explosions accompanying the insertion of the relatively warm rod into the liquid nitrogen produces mechanical vibrations which are transmitted along the rod and to the detector assembly coupled to the rod.

It is therefore an object of the present invention to provide a system for mounting a detector assembly such as an X-ray spectrometer assembly in a high temperature differential environment and in particular a structural mounting system which provides a heat coupling between the detector assembly and a heat reservoir or heat sink and which at the same time decouples the detector assembly from acoustic and mechanical vibrations originating in the heat reservoir or heat sink.

Another object of the invention is to provide a new and improved X-ray spectrometer and cryostat assembly useful in stationary and portable applications.

In order to accomplish these results the invention generally contemplates providing a heat coupling connected between the detector assembly and the thermal reservoir in the form of a flexible inelastic heat pathway between the assembly and thermal reservoir which permits heat conduction while decoupling acoustic and mechanical vibrations originating in the thermal reservoir or heat sink. The invention also contemplates providing structural support between the assembly and thermal reservoir in the form of a flexible, highly damped, low heat conductive shock absorber.

In one embodiment the invention provides an arrangement for mounting the detector assembly to a heat sink comprising an elongate "cold" rod or cryostat "dipstick" of heat conductive material insertable in a low temperature source such as liquid nitrogen. A housing of relatively low heat conductive material is rigidly connected to and coaxially extends from the rod. A detector assembly is structurally mounted in the housing by means of a support ring of low heat conductive flexible highly damped material positioned within the housing and coaxially mounting the detector assembly within the housing. A feature and advantage of this arrangement is that the mechanical and acoustic vibration originating in the cold rod are decoupled or damped out in the structural mounting between the housing and detector assembly.

The invention in this embodiment also contemplates a heat coupling between the detector assembly and rod in the form of a plurality of non-rigid strands of heat conductive material such as woven or braided metal wires connected between the rod and detector assembly to provide a flexible, inelastic heat pathway. A feature and advantage of this arrangement is that mechanical and acoustic vibrations originating in the rod or heat sink or reservoir are not transmitted by the heat coupling.

According to the preferred form of the invention, a novel shock absorbing support ring is provided for mounting the detector assembly coaxially within a rigid tubular housing extending from the rod or the heat reservoir. The support ring is in the form of an annular ring of low heat conductive flexible but highly damped material having an outer perimeter for engaging the housing and an inner perimeter for engaging the detector assembly. The support ring is formed with cutout portions around the inner and outer perimeters to provide passageways through the ring body, reduce surface contact with the housing and detector assembly, and increase damping of vibrations. In the preferred form the support ring is also formed with a depending annular skirt between the inner and outer perimeters defining an annular space open at the ring surface to further increase damping of vibrations.

The invention also contemplates a novel X-ray spectrometer including a plate of silicon for detection of X-radiation and a field effect transistor providing a first stage of amplification, rigidly coupled to the silicon plate in a common sleeve. In one form of the invention, the circuitry for providing a stage of amplification using the transistor includes an electrical connection between the silicon plate and the gate of the field effect transistor. A light diode, actuated by the amplified detector output, is positioned to provide a light actuated feedback loop for the field effect transistor. In order to control the quantity of light feedback from the light diode illuminating the field effect transistor, the invention according to one aspect interposes a light valve in the light feedback path in the form of a first polaroid filter and a light pipe segment having a second polaroid filter formed on one end adjacent the first polaroid filter. The light pipe segment is mounted for rotation relative to the first polaroid filter in order to control the quantity of light illumination on the field effect transistor.

In a preferred form of the invention, electrical contact with the silicon plate is made with a ball of gold wire thread pressed against the silicon plate. A second electrical contact is made via metal foil adhered to a boron nitrate plate which is in turn covering the other side of the silicon plate.

Other objects, features and advantages of the invention will become apparent in the following specification and accompanying drawings.

FIG. 1 is a side cross-sectional view of an X-ray spectrometer, cryostat, and shock mounting and heat coupling assembly embodying the present invention.

FIG. 1A is an enlarged fragmented view of the spectrometer assembly of FIG. 1.

FIG. 2 is a detailed side cross-sectional view of the thermal coupling.

FIGS. 3 and 4 are a plane view and side cross-sectional view respectively of the shock absorber support ring.

FIG. 5 is a schematic diagram of the light actuated feedback circuit.

In the embodiment of the present invention illustrated in FIG. 1 there is generally provided an X-ray spectrometer 10 and cryostat 11. The cryostat 11 consists of the metal rod 12 also referred to as the cold rod connected to a metal tube 13 by means of ring 14. The tube 13 is enclosed at the bottom by a disc 15 and is filled with desicant material or desicant granules such as, for example, Vacsorb desiccant material manufactured by Varian Associates, Inc. The cold rod 12, ring 14, tube 13 and disc 15 are made, for example, out of copper, a metal having high thermal conductivity. The cold rod 12 includes an extension or cold finger 17 also made of copper for high thermal conductivity. Rigidly connected to the cold rod 12 and tube 13 and extending from disc 14 is a tube 16 of, for example, stainless steel having a low thermal conductivity relative to copper providing a heat drop in the temperature profile outward from the cold rod 12. The cryostat 11 comprising these tubes and rods is inserted in liquid nitrogen in order to provide a heat sink for conducting away heat from the spectrometer via a heat coupling as hereinafter described. To this end, a ring or flange 18 is fitted around the tube 16 to provide a bracket or mounting for engaging the container of the liquid nitrogen. This ring or flange 18 is formed of material with low thermal conductivity such as, for example, the plastic sold under the trade name Delron.

The X-ray spectrometer 10 is mounted within a rigid tubular housing 20 made of stainless steel having a low thermal conductivity relative to copper. The stainless steel tubular housing 20 is rigidly connected to the cryostat by means of a stainless steel ring 21. The heart of the spectrometer is a silicon plate detector 22 positioned on a plastic support 23 made of, for example, Teflon plastic, which in turn fits into a holder 24 for the field effect transistor 25. The silicon plate detector and field effect transistor are therefore rigidly mounted with respect to each other. A boron nitride plate 26 is placed against the silicon plate 22 on the other side with a gold plated contact layer 27 in between. A stainless steel disc 28 above plastic spacer 29 closes off the top of the housing tube 20 and spectrometer except for a beryllium window 30 formed at the top.

The gate of field effect transistor 25 is connected to the silicon detector plate 22 by means of electrical lead 31 and a ball of gold thread 32 pressed against the surface of the silicon plate 22. The outputs from the field effect transistor are accessed by electric lead wires 33 and 34. The face of the field effect transistor 25 is positioned in the light conducting pathway of a light pipe segment 35 having a polarized or polaroid filter 36 formed along one face thereof. Adjacent the polaroid face of light pipe segment 35 is a second polaroid filter 37 mounted separate from and stationary relative to the light pipe segment 35. The light pipe segment 35 is rotatable relative to the polaroid filter 37 in order to control the intensity of light illuminating the field effect transistor surface and originating from a light diode 38. A set screw at 40 sets the light pipe segment 35 in the desired rotational position. The light diode is actuated over electrical lead 41 and pin 42 which may for example be gold plated. The entire X-ray spectrometer assembly is housed within an inner tube 43 made for example of relatively high thermal conductivity aluminum. The spectrometer assembly and tube 43 are rigidly connected to an annular feed through ring or disc 45 in turn connected to an aluminum plug 46. The spectrometer elements, tube 43, flange 45 and plug 46 are referred to herein as the spectrometer assembly all the elements of which are rigidly connected with respect to each other.

The entire spectrometer assembly is coaxially mounted within the tubular housing 20 rigidly connected to and extending from the cryostat 11 by means of a novel shock absorbing support ring 50 hereinafter described in more detail with reference to FIGS. 3 and 4. Briefly, the support ring 50 provides a structural mounting between the spectrometer assembly and the rigid housing which is flexible but at the same time highly damped in order to decouple acoustic and mechanical vibrations. The shock absorbing support ring 50 is formed of a material that is flexible but highly damped at low temperature such as for example the plastic sold under the trademark Teflon.

The structural mounting of the spectrometer assembly 10 to the rigid housing 20 extending from the cryostat accomplished by the support ring 50 essentially decouples the spectrometer assembly from mechanical and acoustic vibrations originating in the cryostat, but also decouples or impedes heat flow between the spectrometer assembly and cryostat. The heat coupling is therefore accomplished between the aluminum plug 46 extending from the spectrometer assembly and a similar aluminum plug 51 extending from the cold finger 17 and rod 12. Referring also to FIG. 2, the heat coupling is provided by, in this example, copper braid 52 in the form of a plurality of braided copper wires connected at one end to plug 46 by means of C ring 53 which is made, for example, of bronze or stainless steel and connected at the other end to plug 51 by means of C-ring 54. The length of copper braid 52, in this example in an annular configuration, is connected leaving the braid of wire slack between the two plugs. Other types of braided or woven wires or other configurations of wire bundles can also be used as can be any plurality of strands of heat conductive material. The copper braid 52 effectively provides a flexible inelastic heat path between the plugs 46 and 51 and therefore between the spectrometer assembly and cryostat which decouples and fails to transmit acoustic and mechanical vibrations originating in the cryostat. The word "inelastic" is used herein with reference to the heat path coupling to mean a highly damped coupling which decouples acoustic and mechanical vibrations.

The housing 20 rigidly extending from the cryostat 11 and in which the spectrometer assembly is mounted by means of shock absorber support ring 50 defines a space around the spectrometer assembly and cryostat which communicates with the desicant material 19 within the cryostat tube 13. The vacuum produced by the desicant material therefore communicates directly with the spectrometer assembly through cutouts provided in the support ring 50 as hereinafter described.

The rigid support housing 20 extending from the cryostat is separable into two portions at mating flanges 60 and 61 which form, for example, a conflat or knife edge flange joint providing a vacuum seal so that the top of the housing 20 can be removed to access the spectrometer assembly. Additional electronics such as an amplifier can be contained in the housing 65 in order to process the spectrometer assembly.

As shown in more detail in FIGS. 3 and 4 the novel shock absorber support ring 50 consists of a ring 71 of flexible but highly damped material such as Teflon plastic form with an outer perimeter 72 for engaging the tubular housing 20 which extends rigidly from the cryostat and an inner perimeter 73 for engaging the spectrometer assembly and in particular the plug 46. Cutouts 74 and 75 are formed around the outer and inner perimeters 72 and 73 respectively in order to reduce the surface contact area between the support ring and the tubular housing and spectrometer assembly. Cutouts 74 and 75 in this example are formed in generally circular configurations. The cutouts also serve to permit communication of the vacuum between the cryostat spectrometer assembly and increase the damping effect of mechanical and acoustic vibrations. The ring 71 is also formed between the inner and outer perimeters with a hollow depending skirt 76 defining a space 77 open at the surface of the ring 71 to further increase the damping action of acoustic and mechanical vibrations.

The circuitry for the single stage of amplification provided by the field effect transistor 25 is shown in FIG. 5. The circuitry consists of a feedback circuit in which the feedback loop is accomplished by means of a light diode 38 which stimulates the transistor by illumination through the polaroid filter 37 and light pipe segment 35 having a second polaroid filter 36 formed on one face. The light pipe segment is rotatable relative to polaroid filter 37 so that the two polaroid filters 36 and 37 form an effective light valve, by means of the light coupled feedback loop the need for the standard feedback resistor 80 is eliminated. The amplifier 81 which provides subsequent stages of amplification for the output from the field effect transistor can be mounted for example in the housing 65 heretofore described.

While the present invention has been described with reference to an X-ray spectrometer, it is apparent that the heat coupling and shock mounting system is applicable to a variety of detectors and other assemblies mounted and coupled to a cryostat or other heat sink or heat reservoir.

What is claimed is:

1. A shock mounting and heat coupling system providing a shock free mounting and heat conductive coupling between an assembly and a heat reservoir comprising:

heat coupling means comprising relatively short, flexible, inelastic, heat conductive wires forming a relatively short annular ring of wires connected between the heat reservoir and assembly;

structural housing means comprising low heat conductive material rigidly connected to and extending from said heat reservoir;

and structural mounting means comprising flexible, highly damped, low heat conductive disc means interposed between the assembly and housing, the disc means including cut-out portions providing passageways through the discs means to increase the dampening effect.

2. A detector shock mounting and heat coupling system providing a shock free mounting and heat conductive coupling between a detector assembly and heat sink comprising:

an elongate rod of heat conductive material;

housing means of low heat conductive material rigidly connected to and coaxially extending from sarod;

A shock mounting and heat coupling system promounting means comprising an annular support ring of low heat conductive, flexible, highly damped material positioned within said housing for mounting said detector assembly coaxially within said housing means and for isolating and dampening said detector assembly from longitudinal vibrations of said housing means;

and heat coupling means comprising a plurality of non-rigid strands of heat conductive material connected between the rod and detector assembly to provide a flexible, inelastic pathway between said rod and detector assembly.

3. A detector shock mounting and heat coupling system as set forth in claim 2 wherein said support ring comprises an annular ring of low heat conductive, flexible but highly damped material having an outer perimeter for engaging the housing means and an inner perimeter for engaging the detector assembly, said support ring formed with cutout portions around the inner and outer perimeters to provide passageways through the ring, reduce surface contact with the housing means and detector assembly and increase damping of vibrations, said support ring also formed with a depending annular skirt between the inner and outer perimeters, defining an annular space open at the ring surface to further increase damping of vibrations.

4. A detector shock mounting and heat coupling system as set forth in claim 2 wherein said detector assembly comprises an X-ray spectrometer comprising a plate of silicon, a field effect transistor rigidly coupled with respect to said silicon plate, and circuitry for providing a stage of amplification for the detector output comprising an electrical connection between the silicon plate and the gate of said transistor, a light diode actuated by said transistor output and positioned to provide a light actuated feedback loop for the transistor, and a light valve interposed in the light actuated feedback loop comprising a first polaroid filter and a light pipe segment having a second polaroid filter formed on one end adjacent the first polaroid filter, said light pipe segment mounted for rotation relative to the first polaroid filter.

5. A detector shock mounting and heat coupling system as set forth in claim 4 wherein electrical contact with the silicon plate is made with a ball of gold wire thread pressed against the silicon plate.

6. A detector shock mounting and heat coupling system as set forth in claim 5 wherein said silicon plate is covered on one side by a boron nitrite plate and wherein a second electrical contact is made by metal foil adhered to the boron nitrite plate.

7. A shock mounting and heat coupling system for mounting an X-ray spectrometer assembly in a high temperature differential environment provided by a cold rod insertable in liquid nitrogen comprising:

a common housing for supporting the cold rod and spectrometer assembly said housing comprising a tube of low heat conductive material rigidly connected to the cold rod;

a support ring of low heat conductive material, flexible but highly damped at low temperatures, said ring having an outer perimeter for engaging the housing and an inner perimeter for engaging the spectrometer assembly, said ring formed with cutout portions around the inner and outer perimeters to provide passageways through the ring, reduce surface contact with the housing and spectrometer assembly, and increase damping of vibrations, said ring also formed with a depending annular skirt formed between the inner and outer perimeters and defining an annular space at the opening of the ring surface to further increase damping of vibrations;

and a plurality of flexible wires non-rigidly connected between the cold rod and spectrometer to provide a flexible inelastic heat pathway between the cold rod and spectrometer.

8. A detector shock mounting and heat coupling system as set forth in claim 7 wherein said spectrometer assembly comprises a plate of silicon, a field effect transistor rigidly coupled to said silicon plate, and circuitry for providing a stage of amplification for the detector output comprising an electrical connection between the silicon plate and the gate of said transistor, a light diode actuated by said transistor output and positioned to provide a light actuated feedback loop for the transistor, and a light valve interposed in the light actuated feedback loop comprising a first polaroid filter and a light pipe segment having a second polaroid filter formed on one end adjacent the first polaroid filter, said light pipe segment mounted for rotation relative to the first polaroid filter.

* * * * *

UNITED STATES PATENT AND TRADEMARK OFFICE
CERTIFICATE OF CORRECTION

PATENT NO. : 3,742,729
DATED : 3 July 1973
INVENTOR(S) : Hans R. Zulliger

It is certified that error appears in the above—identified patent and that said Letters Patent are hereby corrected as shown below:

Claim 2, Column 5, line 63: "sarod" is changed to --said rod--

Column 5, line 64 is deleted.

Signed and Sealed this

Twenty-sixth Day of April 1977

[SEAL]

Attest:

RUTH C. MASON
Attesting Officer

C. MARSHALL DANN
Commissioner of Patents and Trademarks